(12) United States Patent
ElShenawy

(10) Patent No.: US 11,741,510 B2
(45) Date of Patent: Aug. 29, 2023

(54) DYNAMIC RIDESHARE SERVICE BEHAVIOR BASED ON PAST PASSENGER EXPERIENCE DATA

(71) Applicant: GM Cruise Holdings LLC, San Francisco, CA (US)

(72) Inventor: Mohamed Mostafa ElShenawy, Bulingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 454 days.

(21) Appl. No.: 16/456,350

(22) Filed: Jun. 28, 2019

(65) Prior Publication Data

US 2020/0410555 A1 Dec. 31, 2020

(51) Int. Cl.
*G06Q 50/30* (2012.01)
*G06Q 30/02* (2023.01)
*G06Q 30/0282* (2023.01)

(52) U.S. Cl.
CPC ......... *G06Q 30/0282* (2013.01); *G06Q 50/30* (2013.01)

(58) Field of Classification Search
CPC .............. G06Q 30/0282; G06Q 50/30; G06Q 30/0283; G06Q 30/0284
See application file for complete search history.

(56) References Cited

U.S. PATENT DOCUMENTS

2017/0357914 A1* 12/2017 Tulabandhula ....... H04W 4/025
2018/0089605 A1* 3/2018 Poornachandran .......................... G06Q 30/0282
2019/0101401 A1* 4/2019 Balva ................... G06Q 10/047
2019/0130319 A1* 5/2019 Zhang .................. G06Q 20/306

FOREIGN PATENT DOCUMENTS

WO WO-2019013852 A1 * 1/2019 ............. G06Q 50/26
WO WO-2019023324 A1 * 1/2019 ......... G01C 21/3438

OTHER PUBLICATIONS

Walz, Eric, "Affectiva Launches Automotive AI Software to Track the Emotional State of Passengers", FutureCar.com, Apr. 27, 2018, https://www.futurecar.com/2057/Affectiva-Launches-Automotive-AI-Software-to-Track-the-Emotional-State-of-Passengers (Year: 2018).*

* cited by examiner

*Primary Examiner* — Resha Desai
*Assistant Examiner* — Michelle E Carey
(74) *Attorney, Agent, or Firm* — Novak Druce Carroll LLP

(57) ABSTRACT

The present technology pertains to providing an improved user experience for user accounts taking group rideshare rides. In some aspects of the present technology, a rideshare service can use ride experience data relating to a group rideshare ride experience by a user account to determine that a user associated with the user account might have reason to be dissatisfied with the group rideshare ride, and can compensate the user account. In some aspects of the present technology, a rideshare service can proactively suggest a group rideshare itinerary to a user account when the group itinerary matches a previous itinerary arranged by the user account, and the suggested group rideshare itinerary can be offered at a preferred charge. In some aspects of the present technology, a rideshare service can permit a user account to create an organized carpool ride with other invited user accounts.

12 Claims, 18 Drawing Sheets

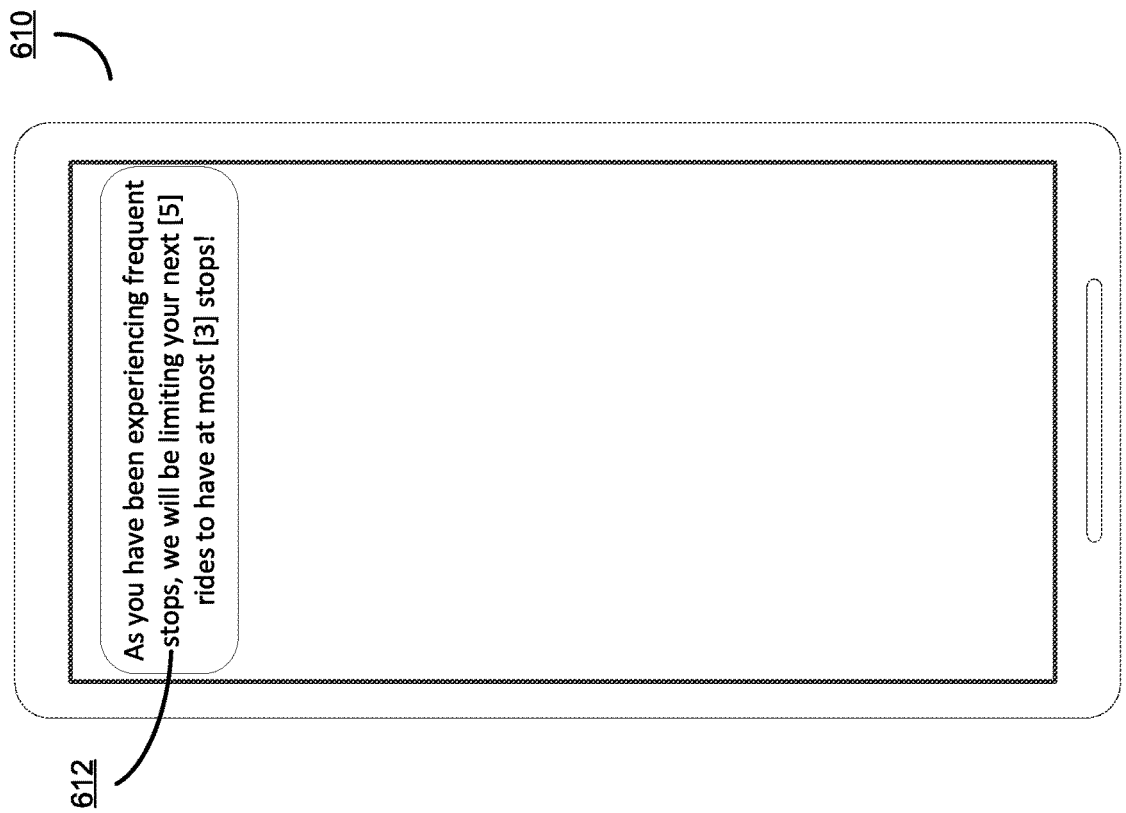

US 11,741,510 B2

DYNAMIC RIDESHARE SERVICE BEHAVIOR BASED ON PAST PASSENGER EXPERIENCE DATA

TECHNICAL FIELD

The present technology pertains to optimizing rideshare services, and more specifically to relying on user account data to offer better rideshare experiences.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

An autonomous vehicle is well suited to transporting passengers of a rideshare service. A rideshare service is traditionally a service wherein a user arranges a ride in a driver's personal vehicle by interacting with an application on their phone. More recently rideshare services are considered any service wherein a ride is arranged by interacting with an application on their phone—regardless of whether the ride is provided in a driver's personal vehicle. Group ridesharing refers to a rideshare wherein multiple passengers that have not coordinated with each other are picked up in the same vehicle often for a reduced fare.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 6A and FIG. 6B illustrates an example user interface embodiment in accordance with some aspects of the present technology;

DETAILED DESCRIPTION

Figure 1:
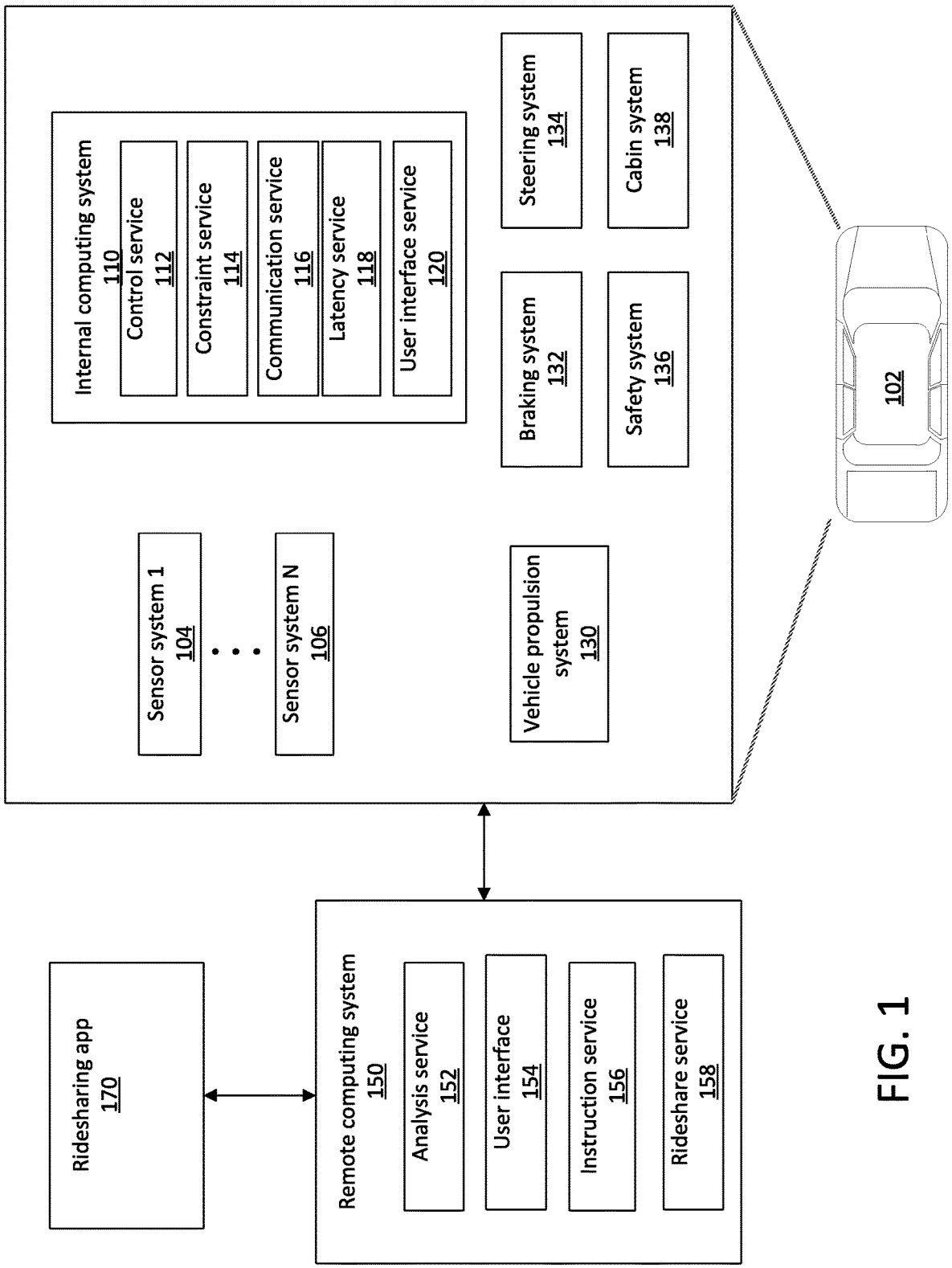
FIG. 1 illustrates an example system embodiment for operating an autonomous vehicle in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for providing a better user experience with a rideshare service. Since rideshare services are mostly operated by computer servers that calculate routes and fares and match user accounts with vehicles, rideshare services currently are not able to take into account a user's satisfaction if that means operating outside of the services programmed bounds.

Rideshare services can learn a lot about a user account and how the user account utilizes the rideshare service. If the rideshare service were to store and analyze ride experience data associated with a user account, the rideshare service could offer a better experience to its users.

The present technology solves some of these problems by recording and analyzing user experience data to modify normal behaviors of the rideshare platform. In some embodiments, a user that has participated in a group rideshare service may have had a few recent experiences where the vehicle stopped to pickup and drop-off more passengers than the average. While the unusual number of pickups and drop-offs might have been the result of random chance, it still might cause dissatisfaction to the user. As such the present embodiment can analyze user experience data for the user account associated with the user and flag the user account for preferential treatment during one or more upcoming rides. For example the user account can be flagged to limit the number of pickups or drop-offs to be less than an average. In this way the rideshare service can ensure all of its user accounts are treated fairly, and can help ensure a user's satisfaction with the rideshare service.

The present technology can also react to ride experience data during a ride. In some embodiments, the rideshare service can determine that the user account is being subjected to more stops than was predicted by the rideshare service at the time of estimating a price, and the rideshare service can dynamically adjust the price to compensate the user for the extra stops. In some embodiments, the user account can be given an option to accept the discount and accept the extra stops, or can reject the discount and the rideshare service will add no more stops to the trip.

Similarly, the rideshare service can also recognize that factors beyond extra stops are causing dissatisfaction for the user. Whether the route chosen for travel included too much traffic, the vehicle experienced a sudden stop, the user got paired with another user that was unpleasant to ride with, the rideshare service can recognize these factors, and can dynamically adjust the trip, plan a new route, give the rider a discount, or take some other remedial action during the trip.

The present technology can further analyze ride experience data to notice a pattern in the user account's ride requests. For example, the ride experience data can indicate that the user account often requests a ride from a certain address between 6 pm-7 pm going to the same address, or neighborhood. In other words, by analyzing ride experience data associated with the user account, the rideshare service can identify the work location and home location or neighborhood associated with the user account. From this information, the rideshare service can proactively suggest a time to get a ride home to the user account that might result in a reduced fare or a shorter trip. In this way, the rideshare service can increase the user's satisfaction with the service and potentially drive further engagement with the rideshare service.

The present technology can further analyze ride experience data to determine reoccurring paring between user accounts in multiple group rideshare trips. Based on an analysis of the ride experience data the rideshare service might determine that a user account tends to rate rides that include the pairing lower, and use this information to avoid grouping the user accounts in the same vehicle together. If the rides are ranked higher, then the opposite can happen and the rideshare service will group the user accounts together when both are available.

In some embodiments, the rideshare service might notice that multiple user accounts appear to be attempting to coordinate a rideshare in hopes of all getting grouped together. Accordingly, the rideshare service can offer a service to offer an organized carpool option where the user accounts in a group rideshare can be planned by the user accounts rather than the rideshare service.

FIG. 1 illustrates environment 100 that includes an autonomous vehicle 102 in communication with a remote computing system 150.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system, and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control the operation of the vehicle propulsion system 206, the braking system 208, the steering system 210, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing application 170 operating on (potential) passenger computing devices. The rideshare service 158 can receive requests to be picked up or dropped off from passenger ridesharing application 170 and can dispatch autonomous vehicle 102 for the trip. The rideshare service 158 can also act as an intermediary between the ridesharing application 170 and the autonomous vehicle wherein a passenger might provide instructions to the autonomous vehicle to 102 go around an obstacle, change routes, honk the horn, etc.

As described herein, some aspects of the present technology involve the gathering and use of data available from various sources to improve quality and experience. The present disclosure contemplates that in some instances, this gathered data may include personal information. The present disclosure contemplates that the entities involved with such personal information respect and value privacy policies and practices.

In some embodiments the rideshare service 158 present technology pertains to collecting ride experience data for a user account and analyzing the data both during a ride, and in aggregate over a period of time. The analysis of the ride experience data can be used to adjust default behaviors of the rideshare service 158 to offer an improved user experience to a user associated with a user account of the rideshare service 158.

Figure 2:
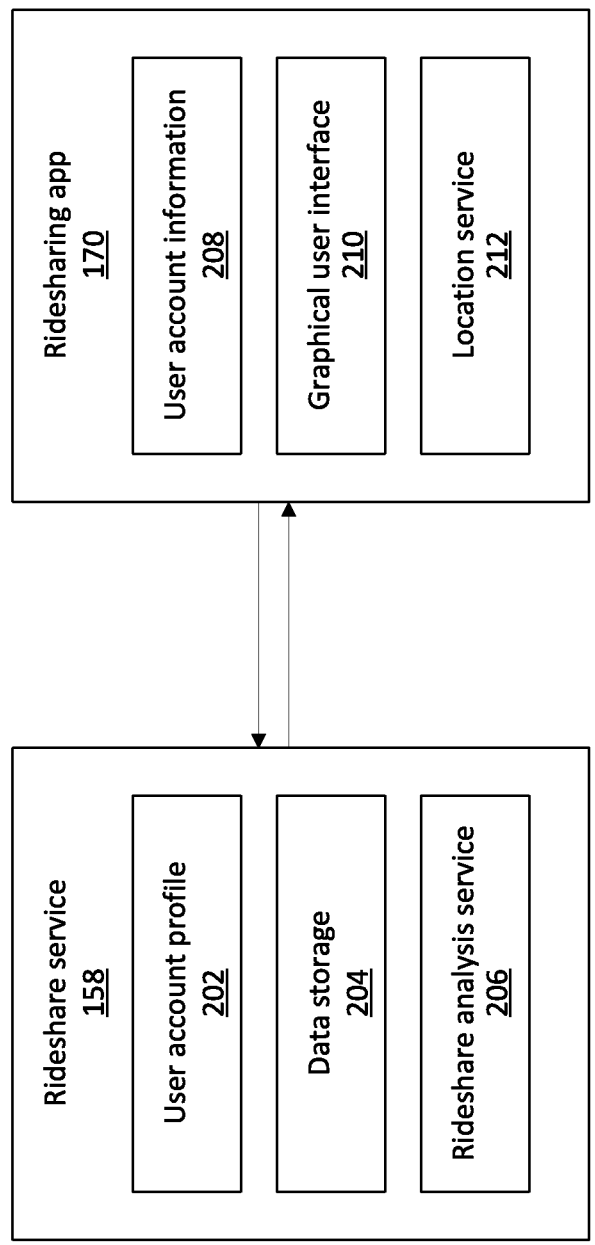
FIG. 2 illustrates an example system embodiment showing a rideshare service interacting with a rideshare application in accordance with some aspects of the present technology.

FIG. 2 illustrates an example system diagram showing the rideshare service 158 and the ridesharing application 170 and their interactions in greater detail. The rideshare service 158 comprises user account profile 202, data storage 204, and rideshare analysis service 206. The user account profile 202 is used to manage account information associated with each user. Such information may include user provided information such as account username, account password, payment method information, name of user, or photo of the user. In some embodiments, the user account profile 202 can also include information learned or observed by the rideshare service 158 including frequent pickup or drop-off locations, repeated trips, or times of day that the user account often requests trips, etc. In general, the user account profile 202 can include any other information that may be useful for the operation of the rideshare service 158 to manage account information associated with the users of the system.

Data storage 204 may be used to store ride experience data. The ride experience data can be associated with one or more user accounts, and can include information recorded during one or more rides. For example, the ride experience data can include basic trip data including pickup location, drop-off location, time of day, number of stops, etc. In additional, the ride experience data can include measurements of ride quality including measurements of harsh stops, sudden accelerations, traffic accidents, etc. In some embodiments, the ride experience data can also include biometric data collected from a user, or conclusions based on biometric data (e.g., facial expression indicates stress or concern, etc.). In some embodiments, ride experience data can include some information that overlaps with information in the user account profile 202, and in some embodiments, the ride experience data can be used to derive information recorded in the user account profile 202. The information storage in data storage 204 can be used by the rideshare analysis service 206.

In addition to user related data recorded during one or more rides, the data storage 204 may also record other information including fleet information. Fleet information can include a number of active vehicles at a particular time, the location of vehicles at a particular time, current utilization of vehicles, etc. The data stored in data storage 204 may be used by rideshare analysis service 206.

Rideshare analysis service 206 is responsible for executing one or more processes. For example, rideshare analysis service 206 may be responsible projecting prices for itineraries, suggesting co-riders on a pooled ride, suggesting co-riders for an organized carpool, determining locations that user accounts repeatedly request itineraries, or any other processes useful for the operation of the rideshare service 158.

The rideshare service 158 interfaces with the ridesharing application 170. This ridesharing application 170 operates on a user device, and comprises user account information 208, a graphical user interface 210, and a location service 212.

In some embodiments, the user account information 208 may include a username, password, user photo, or any information associated with a user's identity. In some embodiments the user account information 208 can substantially overlap with the information stored as part of the user account profile 202 on the rideshare service 158.

The graphical user interface 210 is responsible for causing the presentation of one or more screens of the rideshare application 170. In some embodiments these screens may present users with information like itinerary information, vehicle information, pricing information, and may receive inputs from users interacting with ridesharing application 170 to perform actions like request an itinerary, modify an itinerary, cancel an itinerary, or provide feedback, etc.

The ridesharing application 170 can also include a location service 212 that is responsible for learning location information for use by the ridesharing application 170 and the rideshare service 158. In some embodiments the location service 212 can interact with and integrate with other location services on a mobile computing device on which the ridesharing application 170 is operating. Collectively, whether the code for gathering the location information is part of the ridesharing application 170 of the operating system of the computing device on which the ridesharing application 170 is installed, these services are referred to herein as the location service 212.

The location service 212 may use cellular triangulation or trilateration, Wi-Fi fingerprints, Bluetooth beacons, accelerometers and gyroscopes, or a global positioning system to determine the location of the user device.

As shown in FIG. 2, the remote computing system 150 interfaces with the ridesharing application 170. The ridesharing application 170 may send data like user account information 208, itinerary requests, group rideshare requests, user rideshare feedback, or the current location of the user as determined by location service 212 to the rideshare service 158. Once the rideshare service 158 receives this data from ridesharing application 170, it may perform actions like verifying user identity through the user account profile 202, store at least a portion of the data in data storage 204, or process at least a portion of the data with rideshare analysis service 206.

The rideshare service 158 may also send data to the ridesharing application 170 operating on a user device. For example, the rideshare analysis service 206 of the rideshare service 158 may analyze user data, either received from the ridesharing application 170 or stored in data storage 204, and determine locations that users repeatedly request itineraries from. The rideshare analysis service 206 may also determine the quality of a rideshare experience, charge a user account, compensate a user account, determine an optimal itinerary for a user, determine multiple optimal itineraries over a range of time, or determine additional riders that a user may carpool with. Once the rideshare analysis service 206 has completed all necessary actions, the rideshare service 158 may send the relevant data to the rideshare application 170. After receiving the data from the rideshare service 158, the data may or may not be displayed to the user using the graphical user interface 210.

Figure 3:
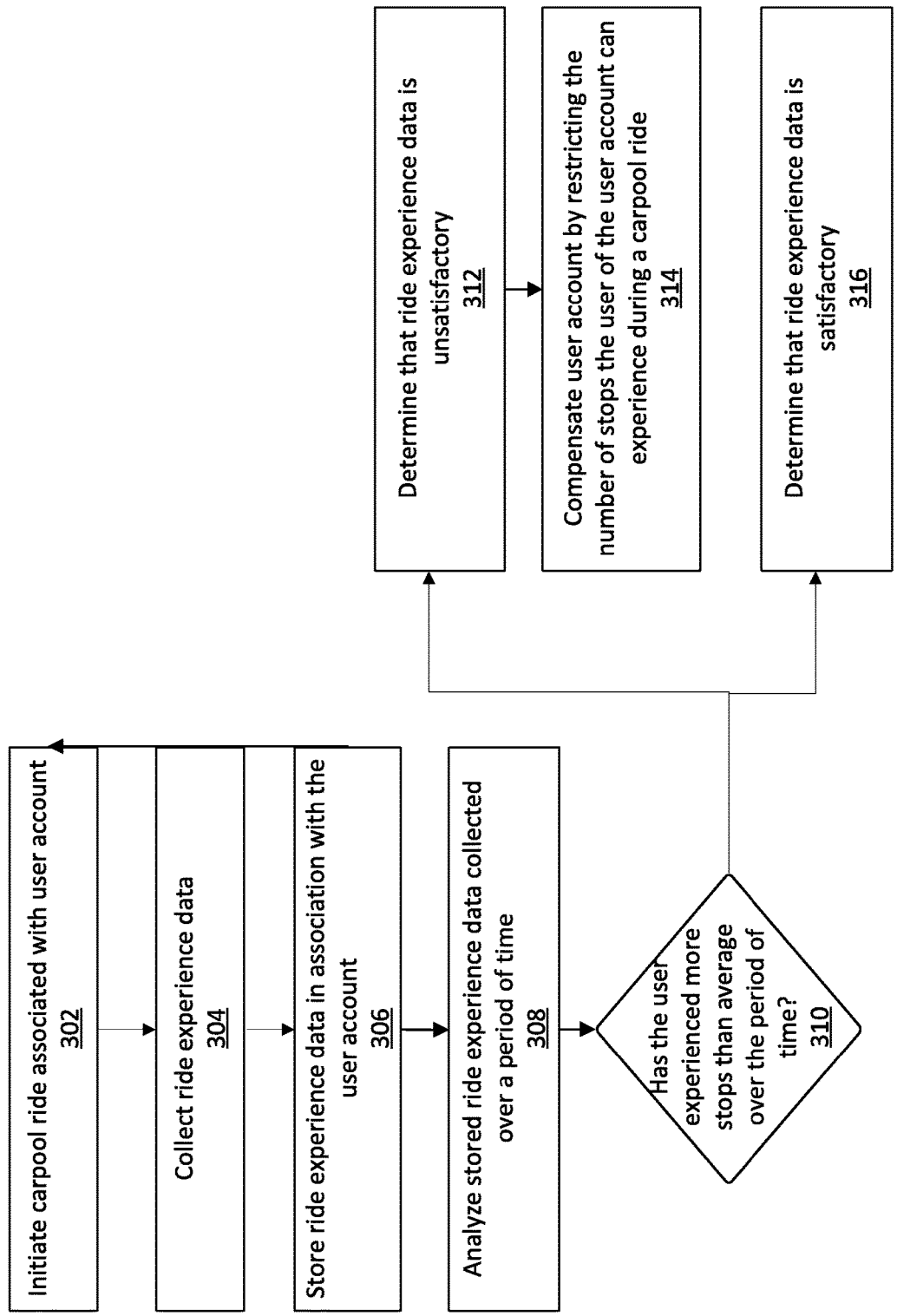
FIG. 3 illustrates an example method embodiment for compensating a user account when a rideshare experience was unsatisfactory in accordance with some aspects of the present technology.

FIG. 3 illustrates an embodiment of the rideshare service 158, in which the rideshare service 158 may compensate the user if it determines a ride experience data includes a current ride or a collection of past rides experienced by the user are/were unsatisfactory. In this context, unsatisfactory can have several meanings. In one meaning, a collection of past rides is considered unsatisfactory because the user account has had bad luck in experiencing a higher number of stops than average in a group rideshare. While this may be the result of random chance, the repeated experience of having a higher number of stops than average might cause a user to feel they are being treated unfairly. Therefore, unsatisfactory can mean that the user has experienced conditions that could allow the user to draw the conclusion (even if incorrect) that they are being treated unfairly. Unsatisfactory can also refer to conditions that the rideshare service 158 determines that the user might or observes that the use has found uncomfortable or unpleasant.

After a user requests an itinerary using the ridesharing application 170, and initiates a carpool ride (302) associated with their user account by entering a vehicle, the rideshare service 158 begins collecting (304) ride experience data. For example, this ride experience data may include measurable ride experience data collected by the vehicle 102, ride experience feedback provided by the user, or itinerary data like the number of stops included in the current itinerary. The measurable ride experience data may be a ride quality index that considers factors like how often the vehicle experienced sudden stops and accelerations, whether or not the vehicle experienced an accident or was almost involved in an accident, or whether there was traffic along the itinerary route. Ride experience feedback may also be collected from the AV 102 by collecting and evaluating user facial expression, or may be collected from the ridesharing application 170 by asking the user to input a ranking.

This ride experience data is then associated with the user account and stored (306) in the data storage 204. The current data may then be combined with past ride experience data associated with the user account and analyzed (308) by the rideshare analysis service 206. For example, the rideshare analysis service 206 may identify the number of stops the user has experienced over a period of time, and determine (310) whether the user has experienced more stops than average over the period of time. If the user has not experienced more stops than average over the period of time, then the user experience data is determined (316) to be satisfactory, and the user account is not compensated. If the user has experienced (310) more stops than average over the period of time, then the ride experience data is determined (312) to be unsatisfactory, and the user account is compensated by restricting (314) the number of stops the user of the user account can experience during a carpool ride.

In some embodiments, the user account is flagged as having stop restrictions. When the rideshare service 158 assigns the user account to a particular AV 102, the AV 102 can be flagged as containing a rider with a restricted number of stops. A user may be notified of such updates via the graphical user interface 210. An example notification 612 is shown in FIG. 6A.

In some embodiments, when the user account is flagged as having stop restrictions, the rideshare service 158 will be restricted from adding more than a determined number of stops to a carpool ride in which the user account is participating.

In some embodiments, the rideshare analysis service 206 may suggest financial compensation for future stops to a user account that has already experienced frequent stops. The financial compensation is not necessarily dependent on the analysis described with respect to FIG. 3. A user account can be offered financial compensation if the current ride has experience too many stops already. An example of such embodiments is given in FIG. 6B, where a notification 622 may be given to suggest additional co-riders, and the user is allowed to either accept the suggestion or ignore it in an interactive window 632.

Besides being used to determine whether ride experience data is satisfactory, as shown in FIG. 3, ride experience data may also be analyzed to suggest itinerary scheduling for user accounts. An example of such a process is provided in FIG. 4.

Figure 4:
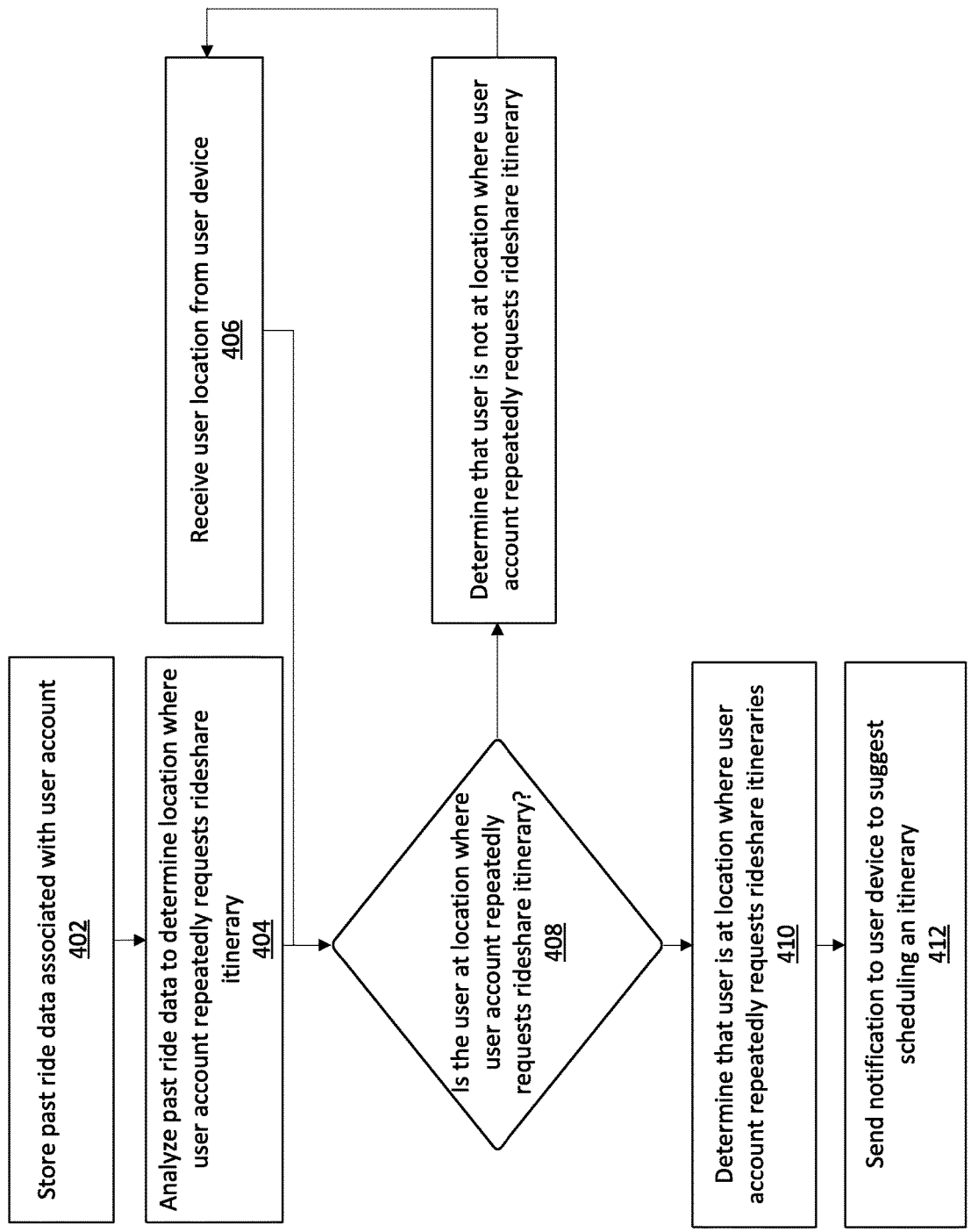
FIG. 4 illustrates an example method embodiment for suggesting a rideshare itinerary to a user account in accordance with some aspects of the present technology.

FIG. 4 illustrates an example method for suggesting a possible itinerary to a user account based on observations from ride experience data. Once the ride experience data is associated with the user account and stored (402) in the data storage 204, the rideshare analysis service 206 analyzes (404) ride experience data to determine a location from which the user account repeatedly requests a rideshare itinerary. The rideshare analysis service 206 may also determine that the repeatedly requested itinerary occurs during a particular timeframe. In some embodiments, the location from which the user account repeatedly request a rideshare itinerary becomes included in the user account profile 202.

The rideshare analysis service 206 can also receive (406) a location of the user device from the ridesharing app 170, as determined by the location service 212. The rideshare analysis service 206 then compares (408) the user device's current location and the location from which the user account repeatedly requests rideshare itinerary. If the rideshare analysis service 206 determines (410) that the user is at the location where the user account repeatedly requests rideshare itineraries, then the rideshare analysis service 206 sends (412) a (e.g., notification 712, as shown in FIG. 7) to the user device to suggest scheduling an itinerary.

In some embodiments, rather than the rideshare application 406 repeatedly sending a user location to the rideshare analysis service 206, the rideshare service 158 can send a list of locations and possible times of day in which those locations are relevant to the rideshare application 170. In such an embodiment, the rideshare application can be responsible for determining that the user device (as a proxy for the user) is at one of the listed locations. Upon determining that the user device is at one of the listed locations, the rideshare application 170 can notify the rideshare service 158, which can then send (412) the notification suggesting one or more possible itineraries.

The proactive recommendation of itineraries provides benefits to the user and the rideshare service 158 beyond convenience to the user, and booking more rides for the rideshare service 158. The proactive recommendation of itineraries also provides a benefit of better planning and more optimal utilization of available autonomous vehicles for the rideshare service 158. Since the rideshare analysis service 206 can predict where vehicles will be at a future time, recommending rides can help vehicles be filled when they are in the area as opposed to reactively routing vehicles in response to ride requests. Since the rideshare service 158 gains efficiencies when the user account accepts a proposed itinerary, the user can benefit from a cheaper ride, and less wait to have a vehicle pick them up.

Figure 7:
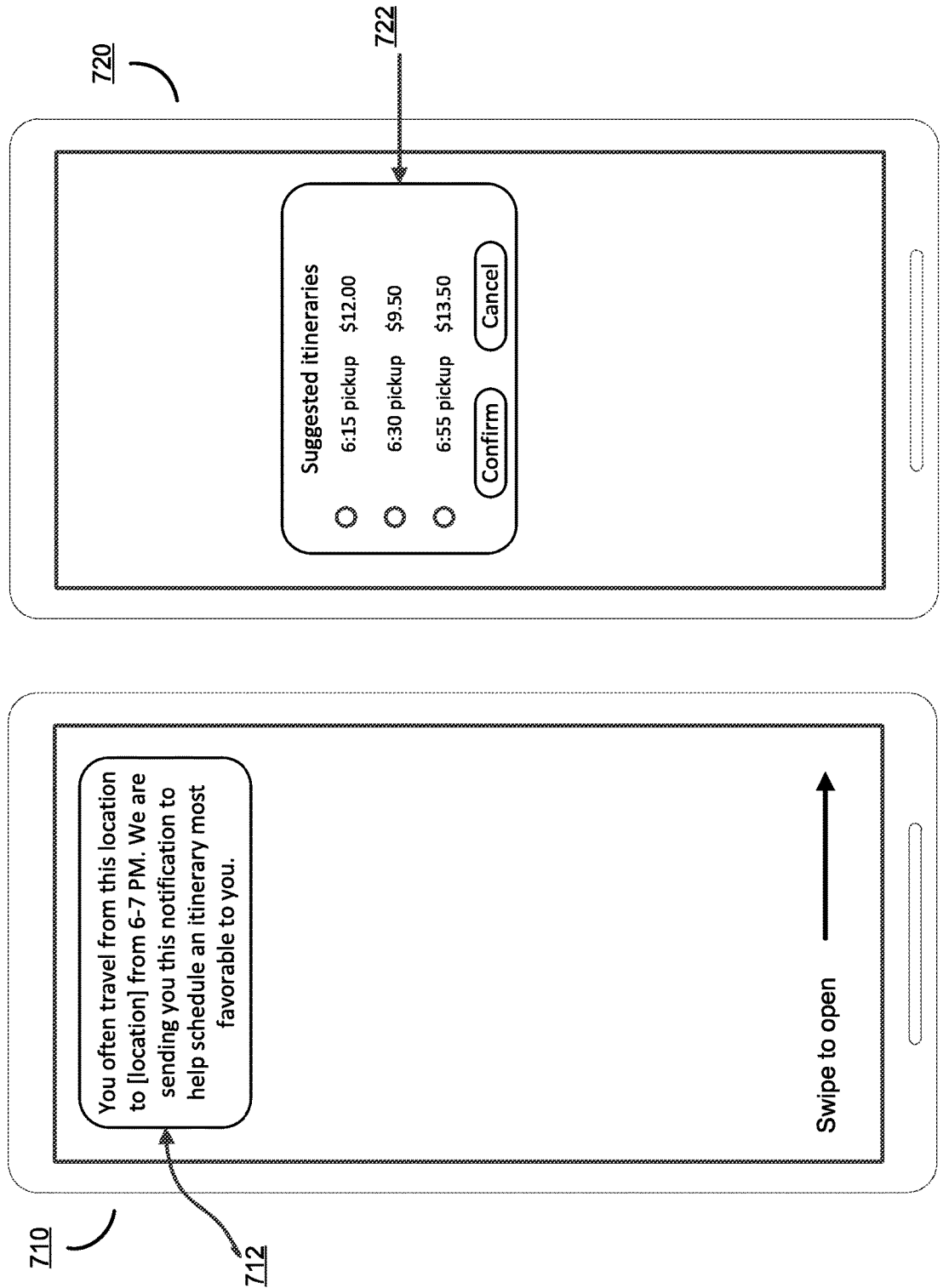
FIG. 7 illustrates an example user interface embodiment in accordance with some aspects of the present technology.

In some embodiments, the rideshare analysis service 206 may suggest multiple itineraries at different times with different fares, these options are then presented to the user on the graphical user interface 210, and the user may select an itinerary from the presented options in an interactive (e.g., as shown in FIG. 7, window 722). In some embodiments, the rideshare analysis service 206 may suggest a timeframe for the itinerary, and allow the user to input a more narrow timeframe, the rideshare analysis service may then determine an ideal itinerary within the more narrow timeframe to allow the user to schedule. The determination of an ideal itinerary may include factors like projected fares, projected itinerary duration, projected number of available vehicles, or projected number of users requesting itineraries at that time.

Figure 5:
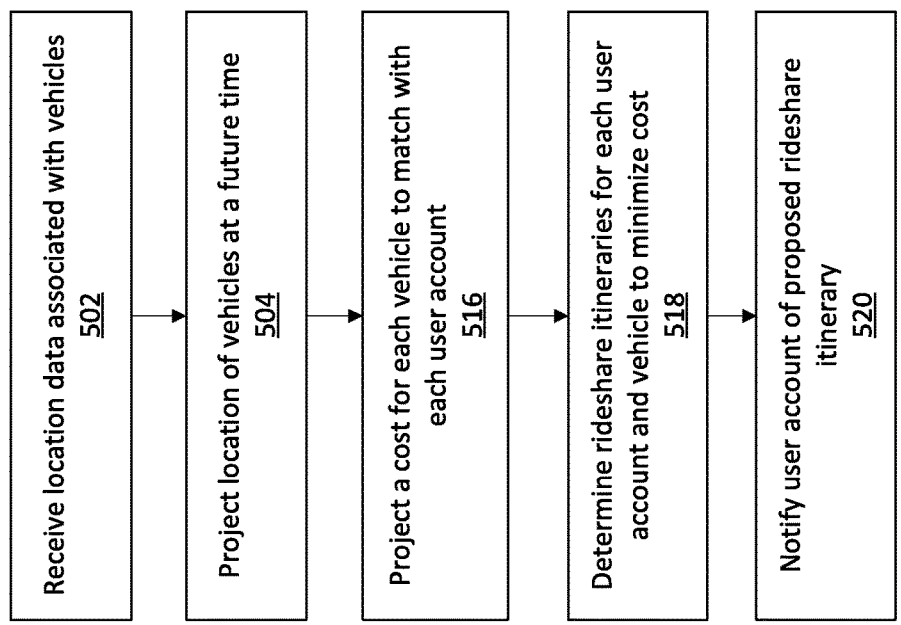
FIG. 5 illustrates an example method embodiment for suggesting a rideshare itinerary to a user account in accordance with some aspects of the present technology.

FIG. 5 illustrates an example embodiment of coordinating suggested itineraries for multiple users. Just as in FIG. 4, the rideshare service 158 or rideshare application 170 can determine (410) that the user is at a location from which they repeatedly request rideshare itineraries, and can suggest (412) scheduling an itinerary. Additionally, in FIG. 5, the suggested itinerary can be optimized for projected vehicle locations and for matching compatible itineraries for multiple user accounts.

In some embodiments, the rideshare analysis service 206 receives (502) location data associated with one or more vehicles. The vehicle location data is used to project (504) the location of vehicles at a future time.

Across multiple user accounts that are eligible to receive suggested itineraries, the rideshare analysis service 206 projects (516) a cost for each vehicle to match with a respective user account. This projected cost may include factors like the projected amount of time each vehicle will need to travel to pick up the user, projected cost of fares, number of stops each user account is projected to experience, or any other factors that may reflect the quality of a projected itinerary. Based on these projected costs, the rideshare analysis service determines (518) rideshare itineraries for each user account and vehicle to minimize cost. In some embodiments, the most efficient itinerary will match two or more user accounts in a group rideshare. The rideshare analysis service may choose to minimize average costs, maximum costs, minimum costs, or utilize other statistical models to perform this optimization. Once the itineraries are determined, the users are notified (520) of the proposed rideshare itinerary via the ridesharing application 170.

FIG. 6A shows an exemplary notification 612 that may be used in embodiments that impose stop restrictions to notify the user that they will experience a limited number of stops in the next few rides. The notification can be presented by the rideshare application 170 or through another messaging application.

Figure 6B:
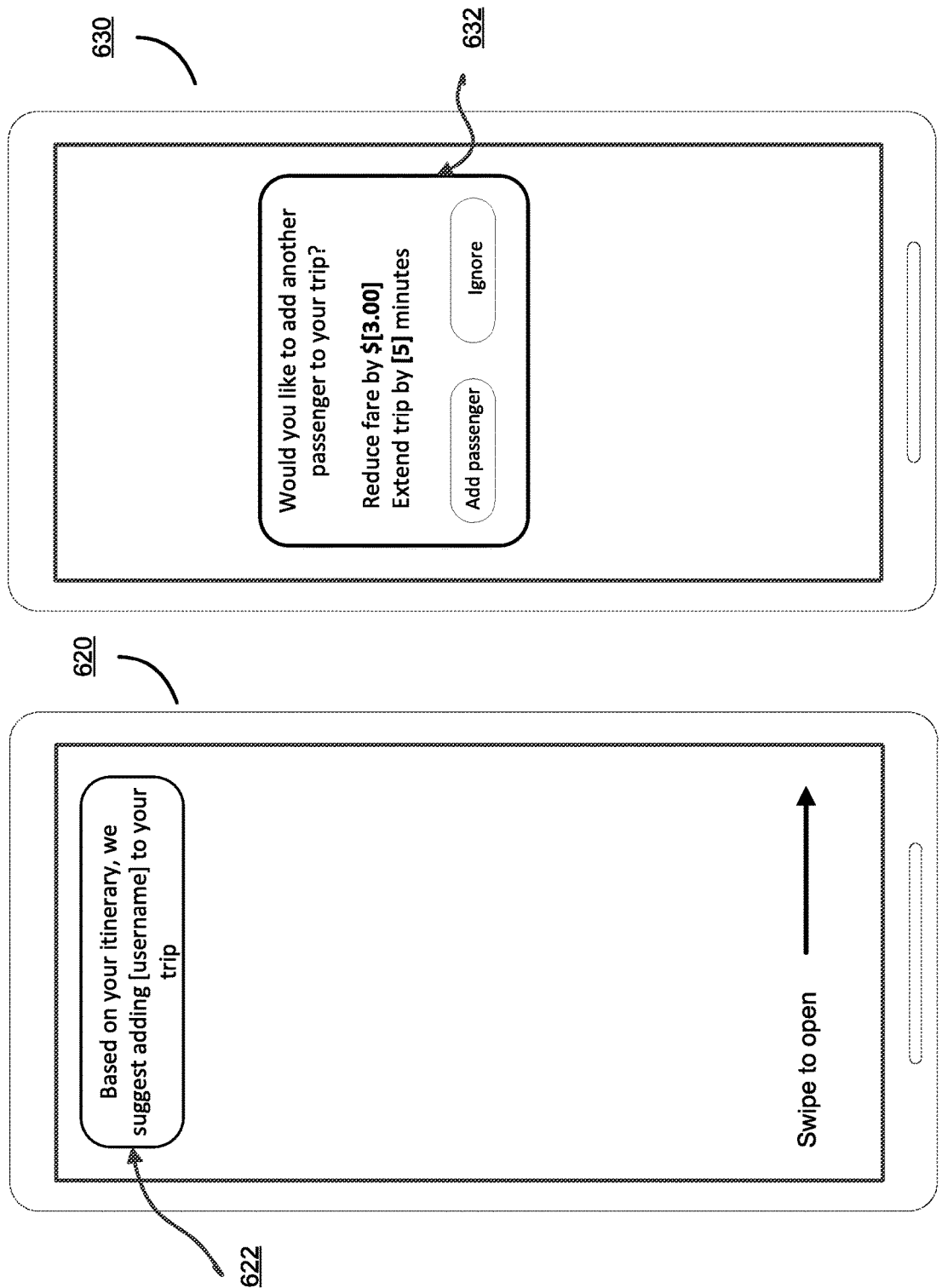

FIG. 6B contains an example user interface used in embodiments that offer financial compensation for users who choose to accept additional stops to their itinerary. Notification 622 prompts the user to accept or reject an additional stop, and interactive window 632 offers more information related to the additional stop, and allows the user to accept or reject this action.

FIG. 7 contains example user interfaces used with embodiments that will recommend itinerary schedules based on a user's past itineraries. Notification 720 notifies the user that the rideshare service 158 has recommended itineraries. If a user would like to view or accept the recommended itineraries, they may enter the rideshare application 170. In embodiments where the rideshare service 158 projects the fares of multiple possible itineraries, an interactive window like 722 may be used to present various scheduling options with projected fare prices.

Another way to create a better user experience is to help users in group rideshares to ride with other passengers they like, or at least that don't create an upsetting environment. In some embodiments, the rideshare analysis service 206 can determine that the user appears to have had a negative reaction to one of the user's co-passengers. This can be determined by monitoring the user's facial expressions by an in car camera, or through explicit feedback given by the user, or otherwise learned through the ride experience data. The same data can be used to identify co-passengers that the user enjoyed riding with. The rideshare analysis service 206 can create a list of compatible or incompatible user accounts and take this list into account when planning route and itineraries for a group rideshare.

In addition to learning which user accounts might be compatible or not compatible to put together in a group rideshare, in some embodiments, a user account might wish to identify other passengers that they desire to travel with. When a group of passengers notifies the rideshare service 158 that they would like to ride together in a group rideshare, this can be called an organized carpool. In some embodiments, one or more users can request an organized carpool to be set up, and other users can join the organized carpool. In some embodiments, users that are not invited, at least implicitly, can not be added to a vehicle that includes an organized carpool passenger.

FIG. 8A, FIG. 8B, FIG. 8C, and FIG. 9 show example embodiments of ways in which users can interact with their instance of the rideshare application 170 to set up an organized carpool with the rideshare service 158.

Figure 8A:
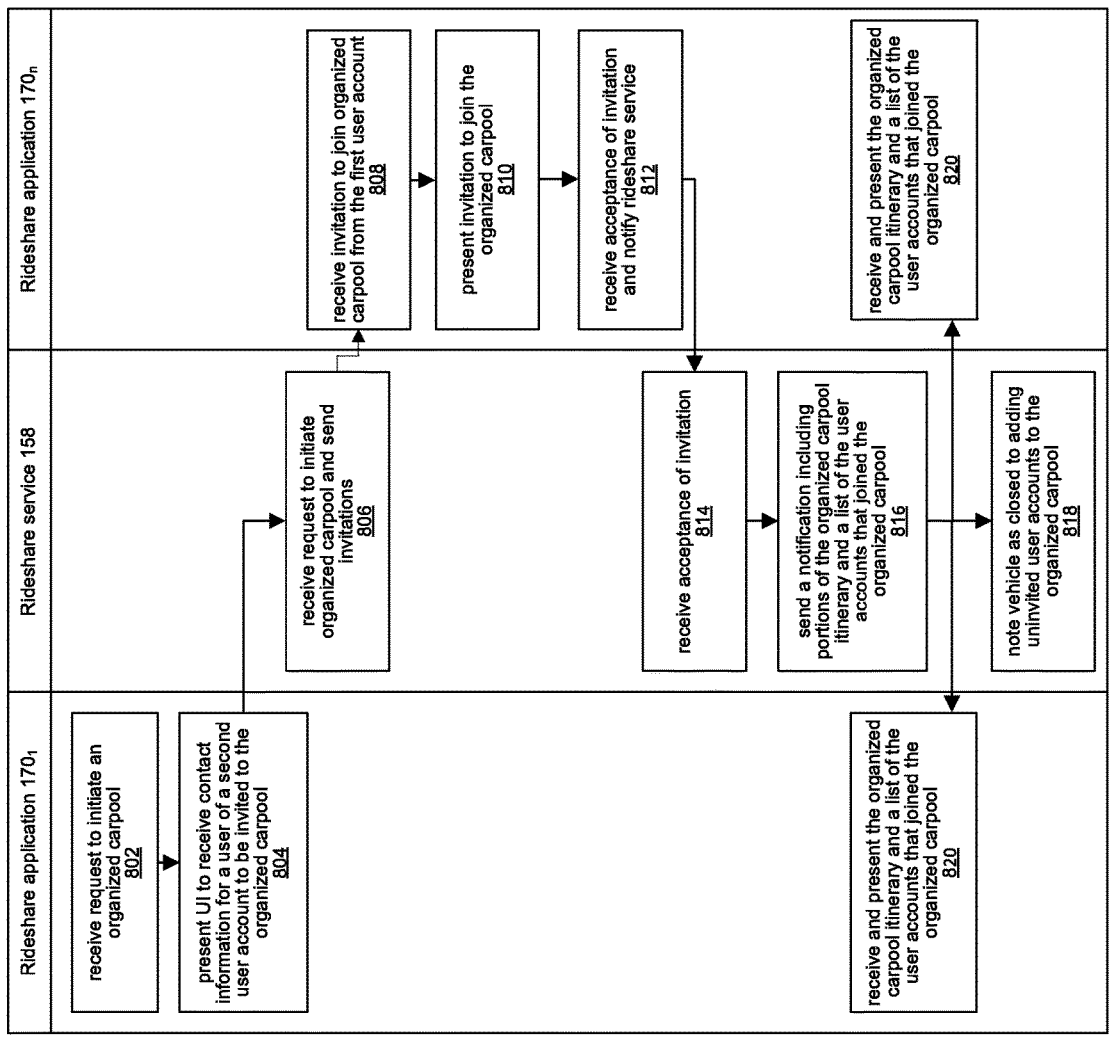
FIG. 8A, FIG. 8B, and FIG. 8C illustrates an example method embodiment for setting up an organized carpool in accordance with some aspects of the present technology.

In FIG. 8A, a first user account can request (802) an organized carpool ride using their instance of the rideshare application $170_1$ executing on the mobile device of the user associated with first user account. The first user can request (802) to initiate an organized carpool through the ridesharing application 170. In FIG. 8A the request (802) can be made at the same time the first user account is contacting the rideshare service 158 to set up a ride.

In some embodiments, the first user may invite other user accounts to join the organized carpool by sending an invitation through the ridesharing service. The first user's rideshare application $170_1$ can present (804) a user interface through the graphical user interface 210. Through this user interface, the first user identifies other user accounts to be invited to join this carpool. For example, a user may identify and invite a second user by entering the second user's phone number, e-mail address, username, or any other type of identifiers.

In some embodiments, the first user may import a list of contacts stored in the mobile device. The list of contacts may include a list of names, a list of phone numbers, or a list of e-mail accounts. The rideshare application $170_1$ may then identify whether each contact in the imported list matches the contact information in a user account profile 202. If there is a matched contact, the corresponding user account is recommended to the first user.

In some embodiments, the rideshare analysis service 206 may suggest a list of potential co-riders for the user to select from. The rideshare analysis service 206 may use past organized carpool itineraries stored in the data storage 204 to identify the user accounts that the current user account has frequently been in organized carpools with and recommend one or more user accounts in a user interface similar to 1020 in FIG. 10A.

In some embodiments, the rideshare analysis service 206 may also present a list of users that are in the same proximate location as the first user's device. The rideshare service 158 may collect location data from all user accounts registered in the rideshare system, and the rideshare analysis service 206 analyzes the location data to find groups of users that are in the same general location. The user accounts that are in the proximate location of the current user device would be recommended in the rideshare application 170.

Once the first user has identified one or more user accounts to invite to join the organized carpool, the request information is sent to the rideshare service 158. The rideshare service 158 receives (806) the request to organize a carpool, as well as a list of user accounts to invite to the carpool. The rideshare service 158 will then send out invitations to the list of invited user accounts to prompt them to accept the invitation. An example notification 1042 is shown in FIG. 10B.

Figure 8B:
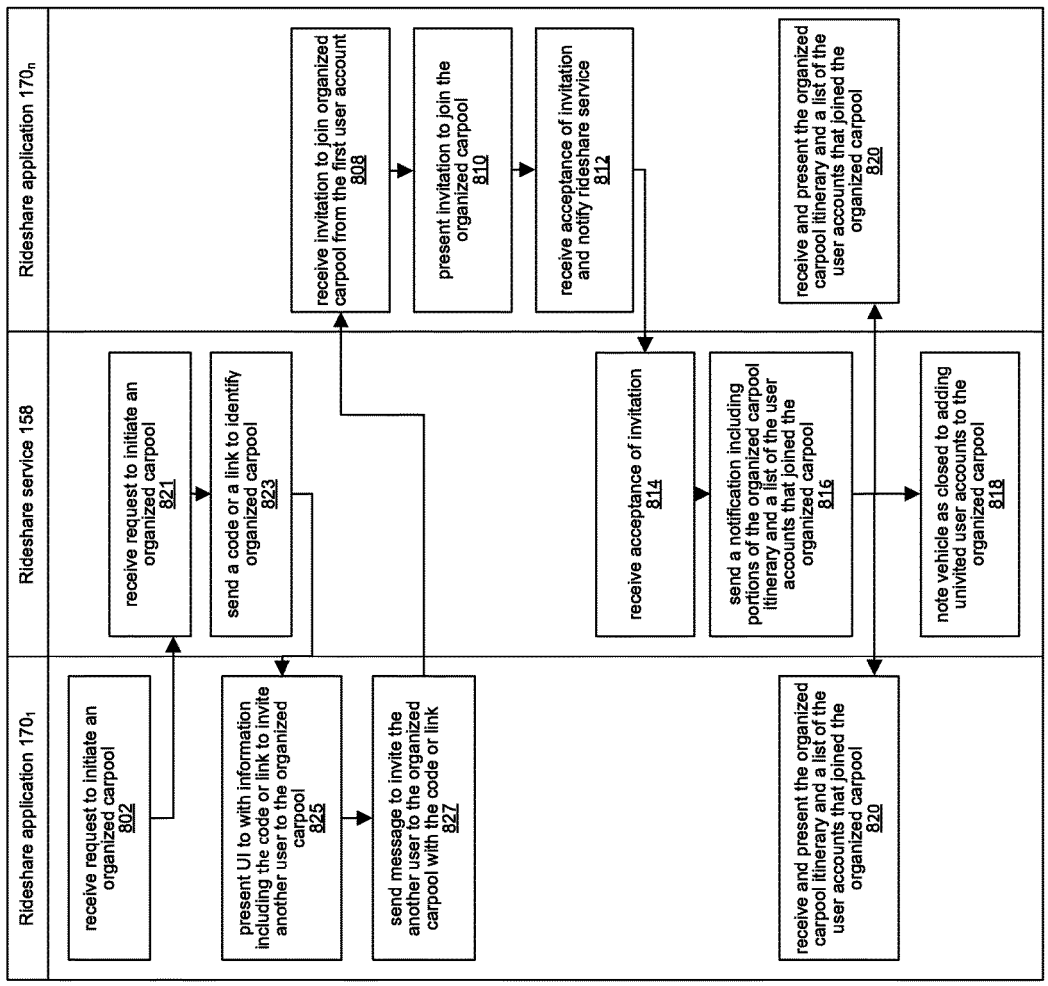

In some embodiments, a user account may invite other user accounts to join the organized carpool through the sharing of a code or link as shown in FIG. 8B. This code or link could be an alphanumerical code, a hyperlink associated with the organized carpool, a barcode, a QR code, or any other type of identifier that is uniquely associated with the organized carpool ride. When the user requests (802) to initiate an organized carpool, the rideshare service 158 receives (821) this request to initiate an organized carpool, and generates and sends (823) a code or a link to identify the organized carpool ride.

In some embodiments, the code or link may be associated with a timeframe such that the code or link is deactivated once the timeframe has passed, and will no longer be associated with the organized carpool ride. Once the link or code is deactivated, other users may no longer use the code or link to join the organized carpool.

In some embodiments, the user that is organizing the carpool may specify the timeframe that the code or link remains active.

In some embodiments, the code or link may remain active indefinitely until the itinerary begins, when at least one user enters the vehicle.

Once generated and sent by the rideshare service 158, the code or link is received by the ridesharing application $170_1$ of the first user account, and the graphical user interface 210 presents (825) information related to the code or link to the first user.

In some embodiments, the user associated with the first user account may invite other user accounts by sending the link or code through other channels of communication, like SMS text messaging services or internet messaging services. In such embodiments, the link or code is presented (825) on the user interface 210. The user account organizing this carpool may then create copies of the link or code and send (827) this link or code to invite another user to the organized carpool with the code or link. Once an invited user receives (808) the link or code, they may provide the link or code to their instance of the rideshare application $170_n$ to be presented (810) with an invitation to join the organized carpool.

Figure 8C:
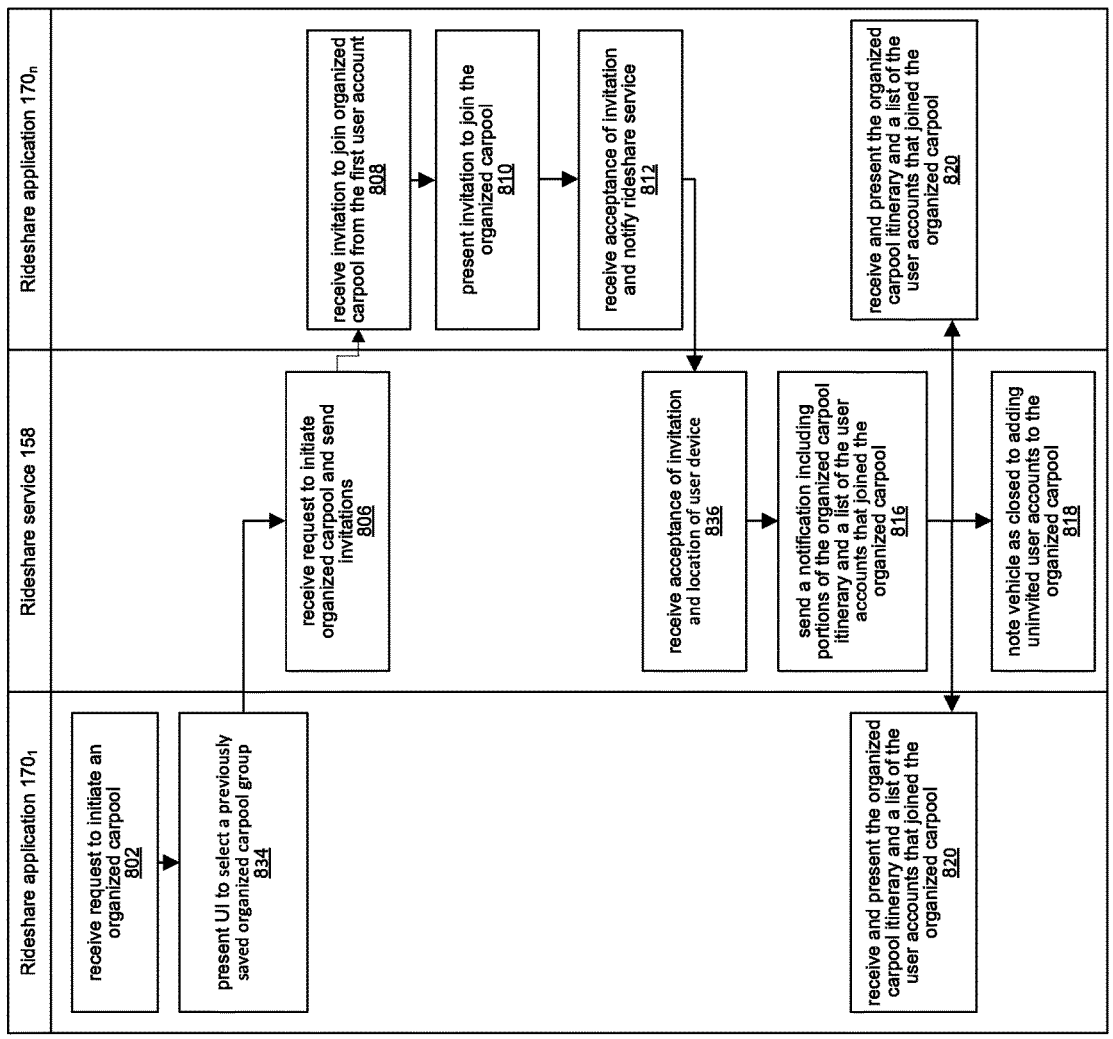

In some embodiments, the rideshare analysis service 206 may also present (834) a list of previously saved organized carpool groups as illustrated in FIG. 8C. In some embodiments a collection of user accounts that have set up an organized carpool in the past can be saved as part of the user account profile 202. When the first user account interacts with their instance of the rideshare application $170_1$, to make a request (802) for an organized carpool, the rideshare application $170_1$ can present (834) a UI to select a saved organized carpool group. Each organized carpool group contains at least one user account, and may be associated with a group name defined by the user. This list of previously saved organized carpool groups may be retrieved from the data storage 204 of the rideshare service 158, may be associated with the user account profile 202, or from a local storage of rideshare application $170_1$.

When the rideshare application $170_1$ received the selection of the saved organized carpool group, it can notify the rideshare service 158. The rideshare service 158 can receive (806) the identification of the saved organized carpool group and the destination for the organized carpool and can send invitations to the group members.

Whether the invitation is set by the rideshare service 158 or by a messaging application on the first user account's mobile device, and as shown in FIG. 8A, FIG. 8B, and FIG. 8C, the invited user is presented (810) with an invitation that the invited user can then accept through the invited user's instance of the ridesharing application $170_n$.

The ridesharing application $170_n$ receives (812) the acceptance of the invitation from the invited user, and communicates the acceptance to the rideshare system 158. Once the rideshare system receives (814) one or more acceptance indications from the invited users, it may send (816) a notification including portions of the organized carpool itinerary and a list of the user accounts that joined the organized carpool.

In some embodiments, the rideshare service 158 may wait to schedule the organized carpool itinerary until all invited user have chosen to accept or deny the organized carpool invitation.

In some embodiments, the rideshare service 158 may wait to schedule the organized carpool itinerary until the user account that is organizing the carpool requests an itinerary.

In some embodiments, the rideshare service 158 may schedule the organized carpool itinerary at a time specified by the user account that is organizing the carpool when the carpool was requested (802).

In some embodiments, the rideshare service 158 may automatically schedule the organized carpool once the number of user accounts that have accepted the invitation reaches the capacity of a vehicle 102.

In some embodiments, the rideshare service 158 may receive (836) the location of the user device and the acceptance of the invitation from the invited user. The rideshare service 158 may then schedule an itinerary to pick up each invited user. In embodiments wherein the group of users is from a saved organized carpool group (FIG. 8C), the rideshare service 158 may already know the location to pick up the invited users from previous organized carpool trips.

In some embodiments, the rideshare service 158 may schedule an itinerary for an organized carpool that involves more than one autonomous vehicle. Each autonomous vehicle may pick up one or more invited users that has accepted the invitation.

Once the itinerary is scheduled, the vehicle is flagged such that other user accounts that are not invited to join the organized carpool are not able to join the ride. The rideshare application $170_1$ of the user account that organized the carpool and the rideshare application $170_n$ of the user accounts that have accepted the carpool invitation receive and present (820) the organized carpool itinerary and a list of the user accounts that joined the organized carpool.

Figure 9:
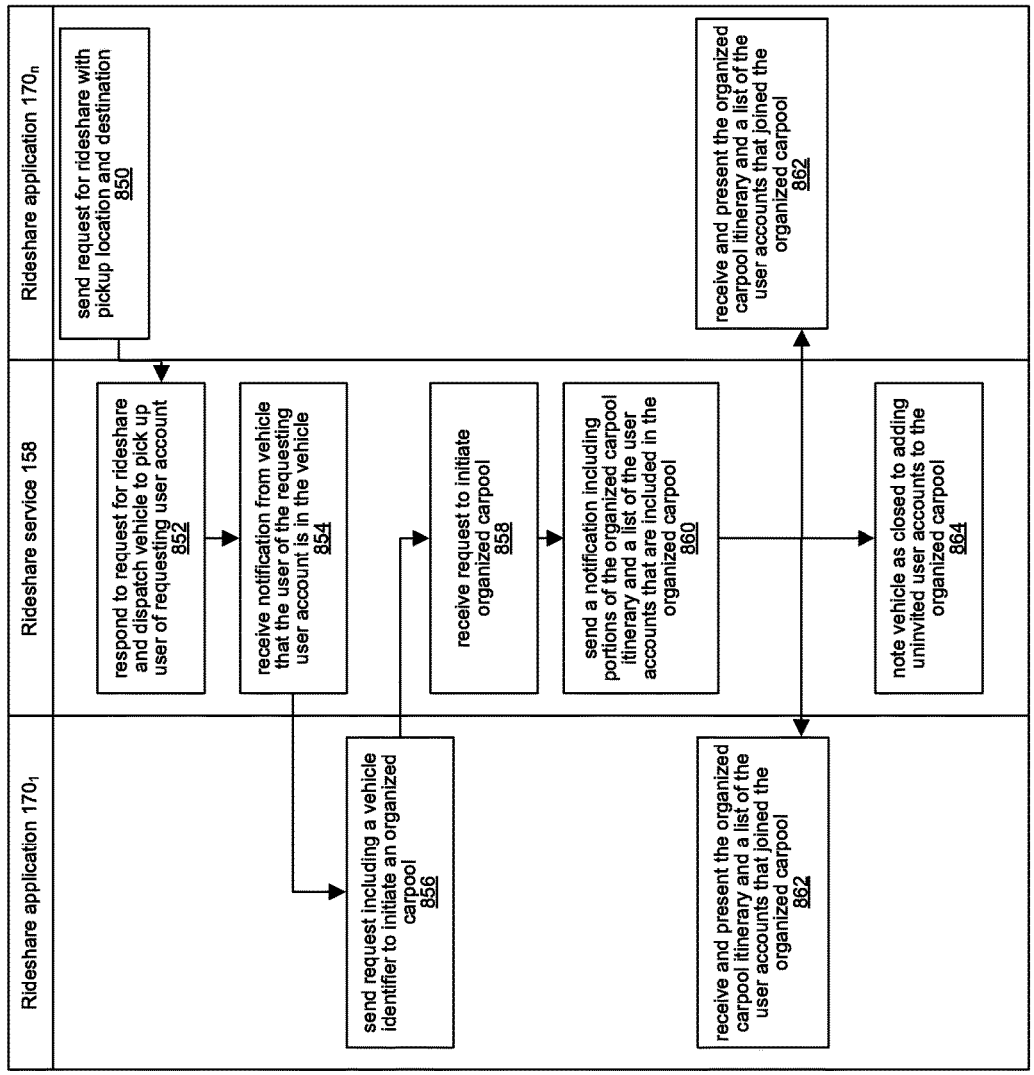
FIG. 9 illustrates an example method embodiment for setting up an organized carpool in accordance with some aspects of the present technology.

As illustrated in FIG. 9, in some embodiments, an organized carpool may be organized after a normal rideshare trip has been initiated. In such embodiments, a user account initiates a rideshare trip by first using the rideshare application $170_n$ to send (850) a request for a rideshare with a specified pickup location and a destination. The rideshare service 158 responds (852) to the request for a rideshare and dispatches a vehicle to pick up the user of the requesting user account. Once the user enters the vehicle, the vehicle sends a notification to the rideshare service 158, which receives (854) this notification and flags the itinerary as started. A first user, that is different that the user associated with the user account that set up the rideshare and that is currently a rider on the rideshare itinerary, may then request through their user account, the first user account using rideshare application $170_1$, to convert the rideshare itinerary into an organized carpool itinerary. The first user of the first user account may send (856) a request through the rideshare application $170_1$. The request should include an indication that the user account would like the current itinerary to be made into an organized carpool, as well as a vehicle identifier. In such embodiments, all user accounts currently on in the vehicle on the rideshare itinerary are invited to join the organized carpool as it is implied that they are invited to ride with the user account that set up the initial rideshare itinerary by virtue of being in the car with that user.

In some embodiments, the vehicle identifier may be the vehicles license plate number or a serial number associated with the vehicle.

In some embodiments, the vehicle identifier may be a link or a code that is presented to the users in the vehicle through a screen. The link or code may be a barcode, QR code, alphanumerical code, or another digital code generated by the remote computing system 150 to uniquely identify the vehicle.

In some embodiments, the vehicle may include a device that emits a signal unique to the vehicle, and the rideshare application 170 would receive this signal and send it to the rideshare service 158 to identify the vehicle.

Once the rideshare service 158 receives (858) the request to modify the current itinerary into an organized carpool, it sends (860) a notification including portions of the organized carpool itinerary and a list of the user accounts that are included in the organized carpool.

In some embodiments, user accounts that are currently on the rideshare itinerary may modify the itinerary by adding additional drop-off locations when they accept the invitation. The rideshare service 158 may then receive this request, adjust the itinerary, and send an updated notification to the user accounts in the organized carpool.

In some embodiments, user accounts that are currently in the organized carpool may invite additional user accounts and additional pickup locations to pick up the additional invited user accounts. The rideshare service 158 may then receive this request, adjust the itinerary, and send an updated notification to the user accounts in the organized carpool.

Once the itinerary is modified to become an organized carpool, the vehicle is flagged such that uninvited user accounts are no longer able to join the itinerary. The rideshare application 170 of the user accounts included in the organized carpool receive (862) and present the organized carpool itinerary and a list of user accounts that joined the organized carpool.

Figure 10A:
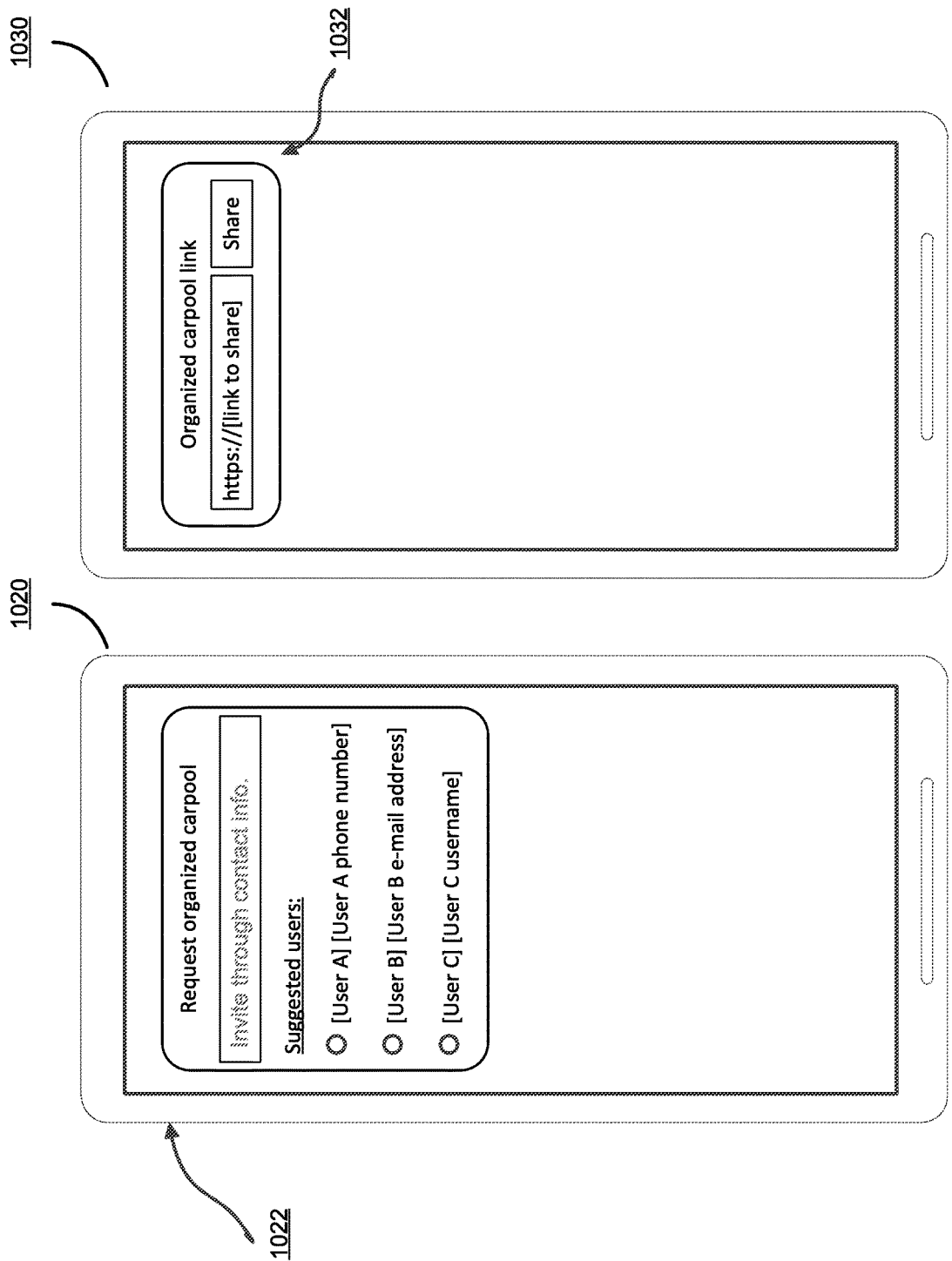
FIG. 10A, FIG. 10B, FIG. 10C, FIG. 10D, and FIG. 10E illustrates an example user interface embodiment in accordance with some aspects of the present technology.
Figure 10B:
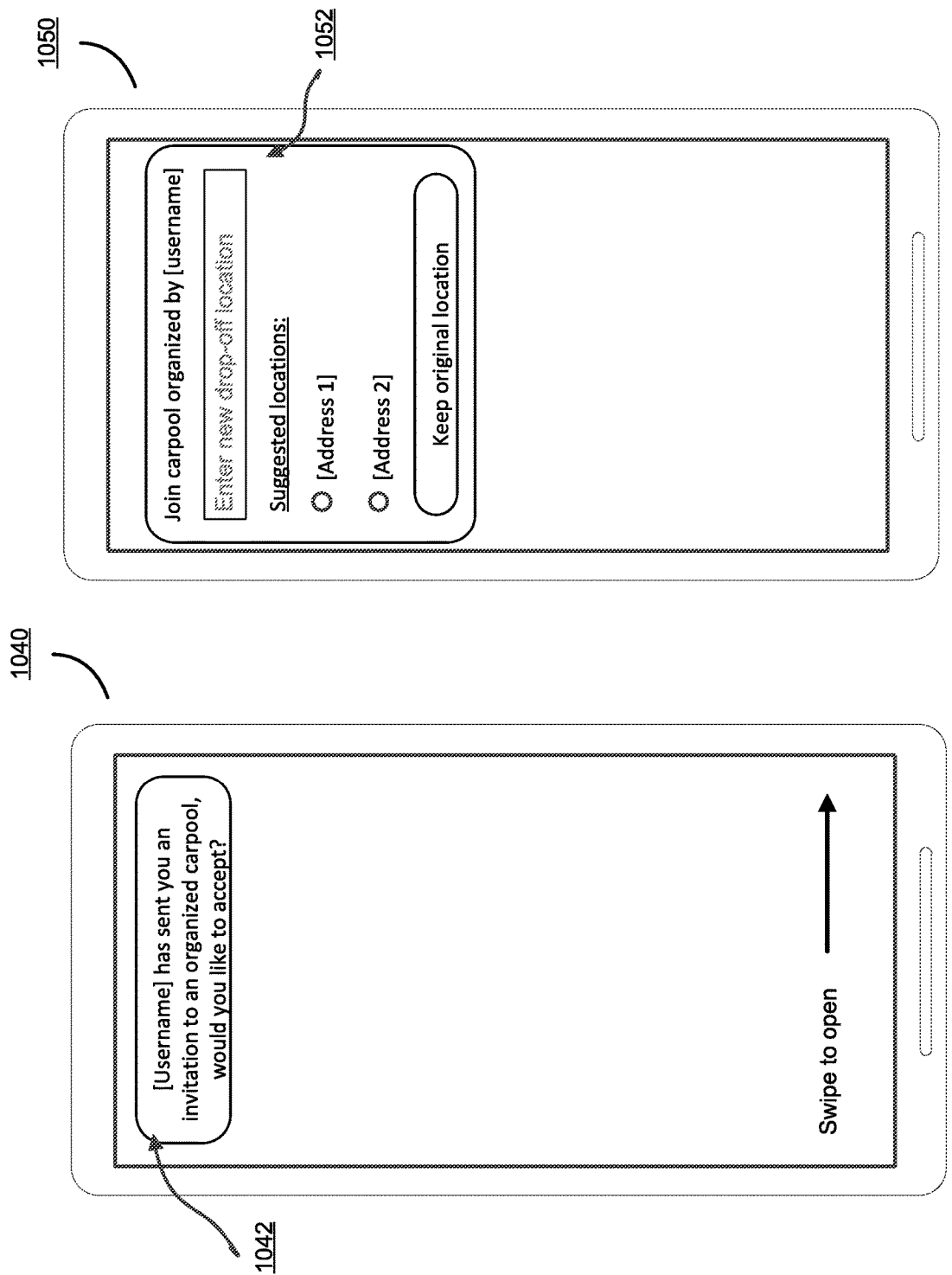

FIG. 10A provides example user interfaces used by the rideshare application $170_1$ for a user to invite other user accounts to join an organized carpool through the rideshare system 158. The user interface 1020 includes an interactive window 1022 that allows the user to identify other user accounts to invite to the organized carpool. The window 1022 also includes a list of suggested users that the user is likely to invite to the organized carpool. The user interface 1030 is used in embodiments that share a code or a link to invite other user accounts to join the organized carpool. The interactive window 1032 displays the code or link generated by the rideshare system 158, and includes a button that allows the user to share the link or code either through the rideshare system 158, or through distributing copies of the link or code through other communication applications.

FIG. 10B provides example user interfaces presented by rideshare application $170_n$ for a user account that has been invited to join an organized carpool. User interface 1040 of FIG. 10B is an example of a notification 1042 informing the user that their associated user account has been invited to join an organized carpool. If the user chooses to take further action to respond to notification 1042, then they may use a user interface like that depicted in 1050. User interface 1050 provides an interactive window 1052 that allows the invited user account to modify the itinerary proposed by the user account organizing the carpool by adding additional drop-of locations, or allows the invited user account to accept the organized carpool without modifying the original itinerary.

Figure 10C:
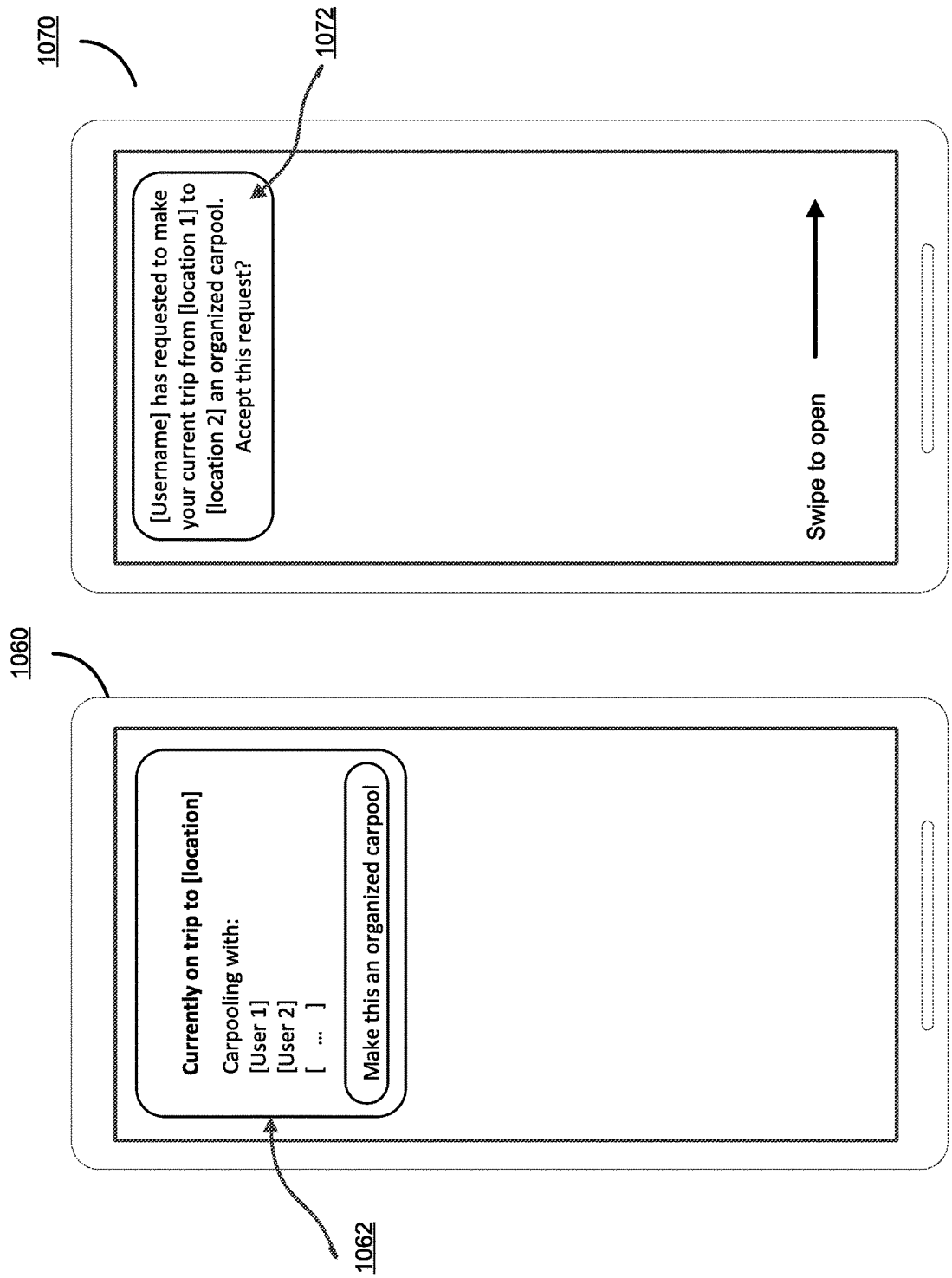
Figure 10D:
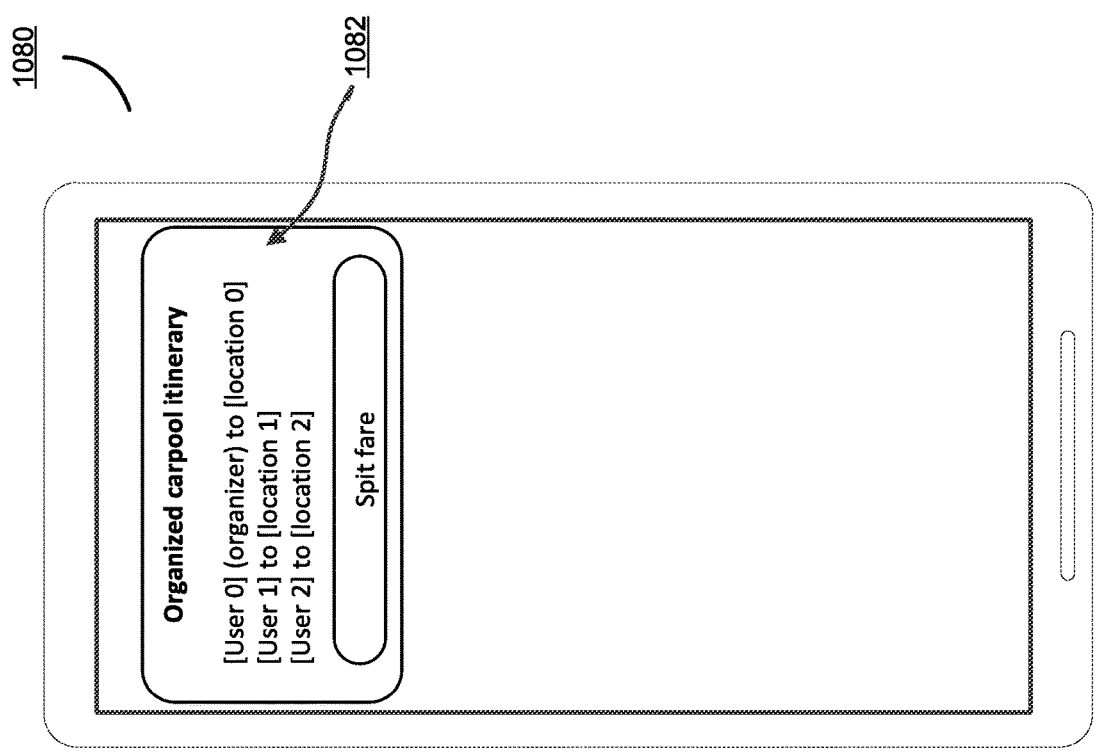

FIG. 10C illustrates user interfaces presented by rideshare application $170_1$ when converting an existing rideshare itinerary into an organized carpool. In the embodiments that allow a user to modify an ongoing rideshare into an organized carpool, the user may request such a modification through an interface like that of 1060. The window 1062 includes information related to the current itinerary, as well as an option to change this itinerary into an organized carpool with the other user accounts involved in the ride. If one user account makes such a request, the other user accounts on the itinerary receive a notification 1072 prompting them to accept the organized carpool invitation. Once the user accounts have accepted the organized carpool invitation, the rideshare application 170 would present the organized carpool itinerary and a list of user accounts in the carpool in 1082.

Figure 10E:
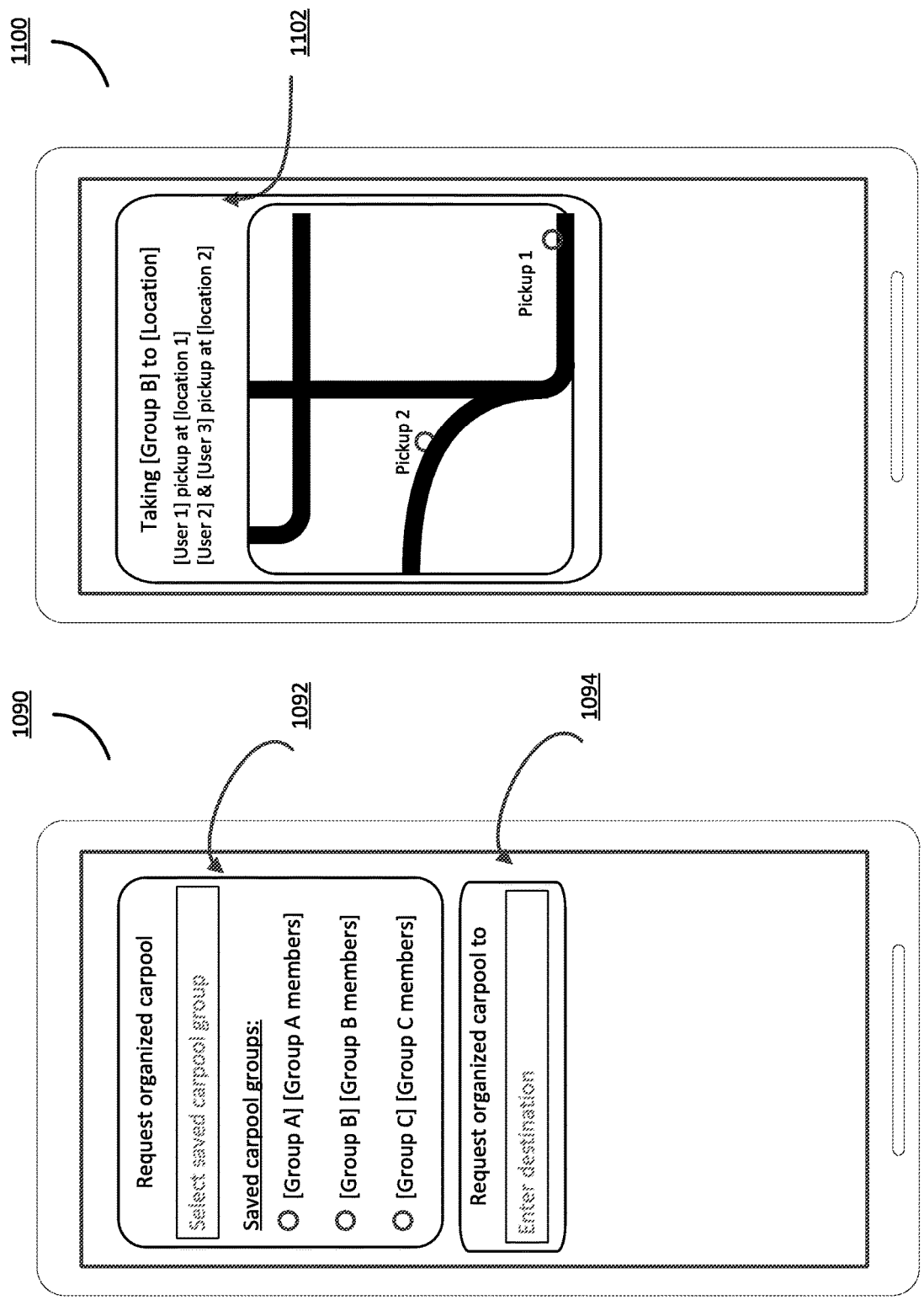

FIG. 10E illustrates user interfaces presented by rideshare application $170_1$ when requesting an organized carpool with a previously saved carpool group. In the embodiments that allow a user to save and select carpool groups, the user may request such an organized carpool through an interface like that of 1090. The window 1092 includes information related to the saved groups, including group names and group members. The window 1094 allows the user organizing the carpool to define a destination for the carpool itinerary. Once the invited users respond to the carpool invitation, and the rideshare service 158 receives the location of the user devices, the rideshare application 170 would present interface 1100 showing the organized carpool itinerary 1102 that identifies the group, the destination of the group, and can present a map of stops to pick up riders along the way.

While various embodiments have been discussed with reference to functions performed by one or more devices or service operating on those devices (AV 102, rideshare service 158, rideshare application 170, etc.) it will be appreciated by those of ordinary skill in the art that the functions can be performed by other devices or services described herein. The descriptions provided herein are for explanatory purposes and should not be considered a required method of practicing the embodiments described.

Figure 11:
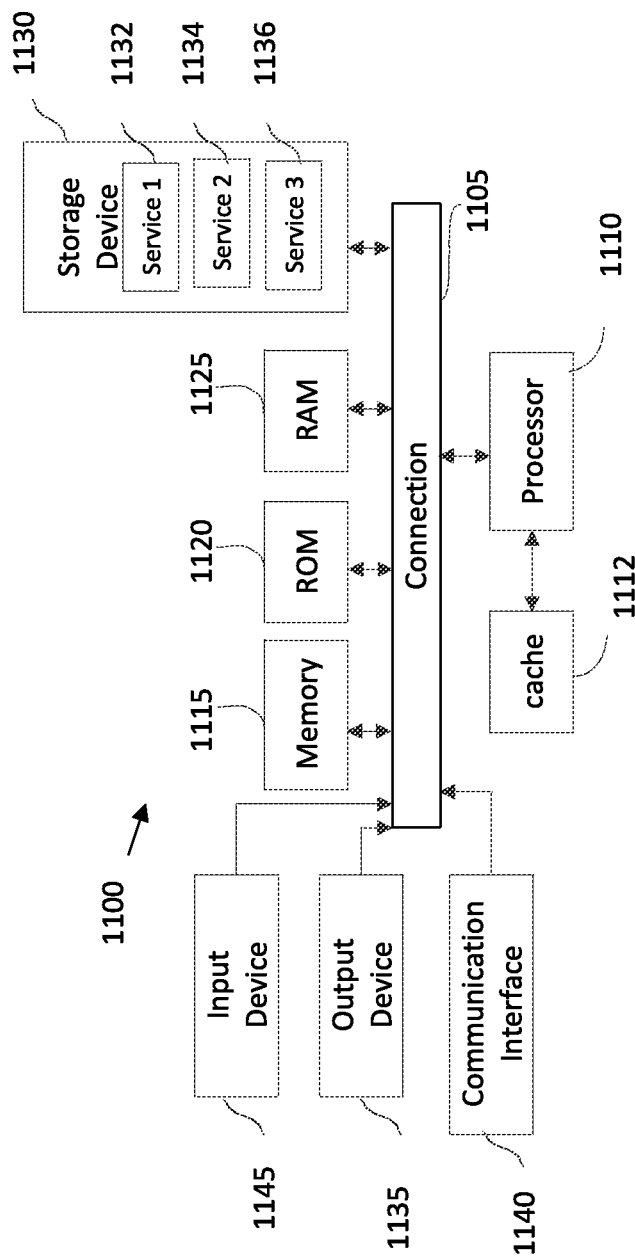
FIG. 11 shows an example of a system for implementing certain aspects of the present technology.

FIG. 11 shows an example of computing system 1100, which can be for example any computing device making up internal computing system 110, remote computing system 150, (potential) passenger device executing rideshare application 170, or any component thereof in which the components of the system are in communication with each other using connection 1105. Connection 1105 can be a physical connection via a bus, or a direct connection into processor 1110, such as in a chipset architecture. Connection 1105 can also be a virtual connection, networked connection, or logical connection.

In some embodiments, computing system 1100 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache of high-speed memory 1112 connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms known to those of skill in the art. In some instances, multimodal systems can enable a user to provide multiple types of input/output to communicate with computing system 1100. Computing system 1100 can include communications interface 1140, which can generally govern and manage the user input and system output. There is no restriction on operating on any particular hardware arrangement, and therefore the basic features here may easily be substituted for improved hardware or firmware arrangements as they are developed.

Storage device 1130 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as processor 1110, connection 1105, output device 1135, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions, the instructions when executed are effective to cause the computer to:
   collect ride experience data from one or more sensors of an autonomous vehicle for a portion of a carpool ride traveled while a user is in the autonomous vehicle, the user having a user account with a rideshare service, wherein the autonomous vehicle is dispatched by the rideshare service;
   determine that the ride experience data indicates that the carpool ride included greater than an average number of pickup and drop-off stops for an average carpool ride of a fleet associated with the rideshare service in response to determining that the carpool ride included greater than the average number of pickup and drop-off stops for the average carpool ride flag the user account with a stop restriction, wherein the stop restriction restricts a number of stops the user can experience during the carpool ride;
   evaluate biometric data for the user collected from the one or more sensors of the autonomous vehicle;
   and determine, from the biometric data, that a facial expression of the user indicates that the user was unhappy during a number of pickup and drop-off stops during at least a portion of the carpool ride;
   flag the autonomous vehicle as containing the user associated with the user account with the stop restriction based on the facial expression and the number of pickup and drop-off stops in the carpool ride;
   and restrict the autonomous vehicle from adding pickup or drop-offs to the carpool ride via the rideshare service when the autonomous vehicle is flagged as containing the user with the user account with the stop restriction.

2. The non-transitory computer readable medium of claim 1 wherein the determination that ride experience data indicated that the carpool ride included greater than an average number of pickup and drop-off stops for an average carpool ride is made during the carpool ride, and wherein the instructions when executed are further effective to cause the computer to:
   in response to determining that the carpool ride included greater than the average number of pickup and drop-off stops for the average carpool ride, reduce a fare for the carpool ride.

3. The non-transitory computer readable medium of claim 1 wherein the instructions when executed are further effective to cause the computer to:
   in response to determining that the carpool ride included greater than the average number of pickup and drop-off stops for the average carpool ride, associate a maximum number of stops for a future carpool ride with the user account.

4. The non-transitory computer readable medium of claim 3 comprising instructions that when executed are further effective to cause the computer to:
   plan a subsequent carpool ride for the user account in a second autonomous vehicle;
   determine that a pickup or drop-off is on the route of the subsequent carpool ride;
   determine that the user account is associated with the maximum number of stops, and that added pickups or drop-offs to the subsequent carpool ride would result in a greater number of stops than the maximum number of stops;
   and restrict the second autonomous vehicle from adding pickups or drop-offs to the subsequent carpool ride via the rideshare service.

5. The non-transitory computer readable medium of claim 1, wherein the instructions to determine that the ride experience data indicated that the carpool ride included greater than an average number of pickup and drop-off stops for an average carpool ride that is calculated over multiple carpool rides.

6. The non-transitory computer readable medium of claim 1, wherein the ride experience data further indicates that the portion of the carpool ride resulted in ride experience data that was unsatisfactory, and wherein the instructions that when executed are further effective to cause the computer to:
evaluate ride quality data;
and determine that the ride quality data reflects that at least a portion of the carpool ride was uncomfortable.

7. The non-transitory computer readable medium of claim 1, wherein the instructions to restrict the autonomous vehicle causes a computing system of the autonomous vehicle to activate a constraint based on the stop restriction, and wherein the autonomous vehicle operates based on the constraint.

8. A method, performed by one or more processors, comprising:
collecting ride experience data from one or more sensors of an autonomous vehicle for a portion of a carpool ride traveled while a user is in the autonomous vehicle, the user having a user account with a rideshare service, wherein the autonomous vehicle is dispatched by the rideshare service;
determining that the ride experience data indicates that the carpool ride included greater than an average number of pickup and drop-off stops for an average carpool ride of a fleet associated with the rideshare service;
in response to determining that the carpool ride included greater than the average number of pickup and drop-off stops for the average carpool ride, flag the user account with a stop restriction, wherein the stop restriction restricts a number of stops the user can experience during the carpool ride;
evaluating biometric data for the user collected from the one or more sensors of the autonomous vehicle;
and determining, from the biometric data, that a facial expression of the user indicates that the user was unhappy during a number of pickup and drop-off stops during at least a portion of the carpool ride;
flagging the autonomous vehicle as containing the user associated with the user account with the stop restriction based on the facial expression and the number of pickup and drop-off stops in the carpool ride;
and restricting the autonomous vehicle from adding pickups or drop-offs to the carpool ride via the rideshare service when the autonomous vehicle is flagged as containing the user with the user account with the stop restriction.

9. The method of claim 8, wherein the determining that ride experience data indicated that the carpool ride included greater than an average number of pickup and drop-off stops for an average carpool ride is made during the carpool ride, the method further comprising:
in response to determining that the carpool ride included greater than the average number of pickup and drop-off stops for the average carpool ride, reducing a fare for the carpool ride.

10. The method of claim 8, further comprising:
in response to determining that the carpool ride included greater than the average number of pickup and drop-off stops for the average carpool ride, associating a maximum number of stops for a future carpool ride with the user account.

11. The method of claim 10, further comprising:
planning a subsequent carpool ride for the user account in a second autonomous vehicle;
determining that a pickup or drop-off is on the route of the subsequent carpool ride;
and determining that the user account is associated with the maximum number of stops, and that added pickups or drop-offs to the subsequent carpool ride would result in a greater number of stops than the maximum number of stops;
and restricting the second autonomous vehicle from adding pickups or drop-offs to the subsequent carpool ride via the rides hare service.

12. The method of claim 10, wherein determining that the ride experience data indicated that the carpool ride included greater than an average number of pickup and drop-off stops for an average carpool ride is calculated over multiple carpool rides.

* * * * *